Figure 1:
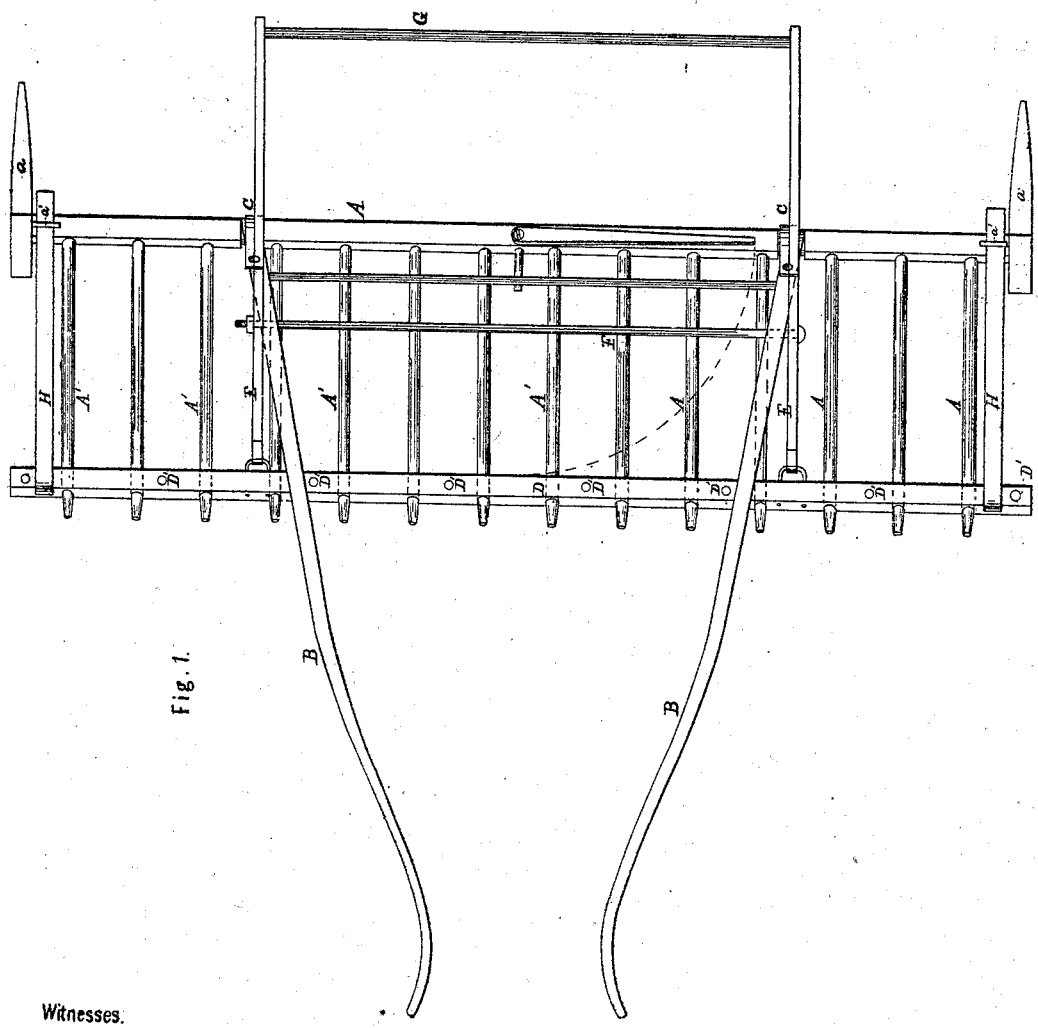

Sheet.1.2.Sheets.

D. Prest.
Horse Rake.

N° 47980.          Patented May 30, 1865.

Witnesses:
G. A. C. Smith.
E. W. W. Griffin.

Inventor.
Daniel Prest.

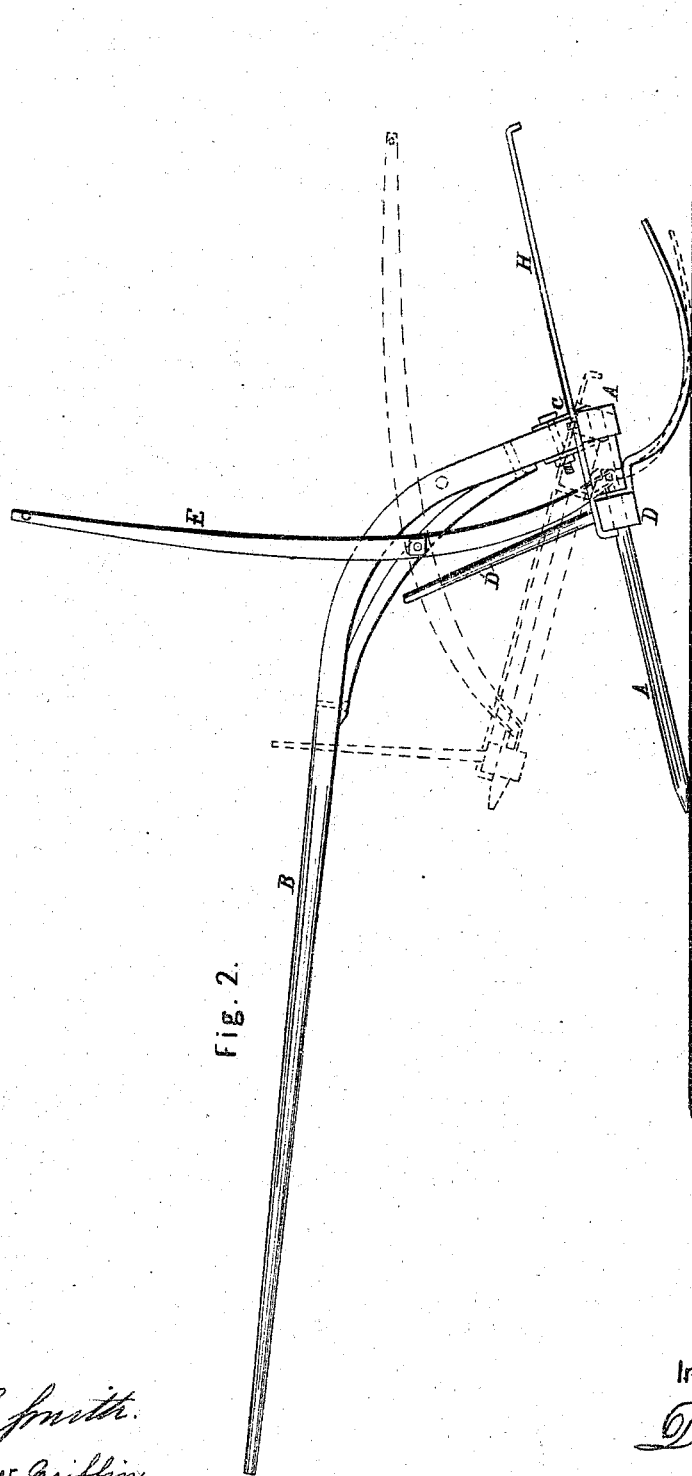

UNITED STATES PATENT OFFICE.

DANIEL PREST, OF MARLBOROUGH, NEW JERSEY.

IMPROVEMENT IN HORSE-RAKES.

Specification forming part of Letters Patent No. 47,980, dated May 30, 1865.

*To all whom it may concern:*

Be it known that I, DANIEL PREST, of Marlborough, in the county of Monmouth and State of New Jersey, have invented a new and useful Improvement in Horse-Rakes; and I do hereby declare the following to be a full and exact description of the same, reference being had to the accompanying drawings, making part of this specification, in which—

Figure 1 is a plan of a horse-rake embodying my invention. Fig. 2 is an end elevation of the same.

Similar letters of reference indicate corresponding parts in the two figures.

This invention relates to a rake of novel and simple construction, and pertains to that class in which the head rests upon the ground and the teeth project horizontally forward therefrom.

The purpose of the invention is to facilitate the discharge of the hay as it is taken up by the teeth in successive quantities, as will be hereinafter explained.

To enable others skilled in the art to which my invention appertains to fully understand and use the same, I will proceed to describe its construction and operation.

In the accompanying drawings, A represents the rake-head, and A' the teeth, which project forward and move in contact with the ground, so as to gather the hay as the machine moves forward, said teeth being allowed free vertical movement by the runners or supports $a$, which are located at the respective ends of the rake-head A, and are curved to adapt themselves to any changes in the position of the machine which may be caused by inequalities of the ground.

The thills B are attached to the rake-head by means of ox-straps C, in which the said rake-head may turn freely.

D is a transverse bar having a series of holes or mortises, which are occupied by the teeth A' in the manner illustrated in Fig. 1. Attached to and projecting upwardly from the bar D are the clearers D', whereby the hay is disengaged from the rake-teeth A'.

E E are levers or arms, hinged at their lower ends to the bars D, pivoted at a suitable point between their ends to the rod F, and connected at their upper extremities by the bar G. By drawing back or depressing the bar G the levers are turned on their pivots, and the bar D is moved in the arc of a circle. This movement of the bar D causes it to approach the forward ends of the rake-teeth A', and at the same time raises said forward ends to permit the hay to be thrown off or dislodged from the teeth A' by the bar D and clearers D'. While the teeth are being thus elevated the head A rotates within the bearings C independently of the thills.

In Fig. 2 a perspicuous illustration of the operation is given by the red lines. On each end of the bar D is a bar, H, which bars, working through loops $a'$ $a'$ on the rake-head, serve as guides for the bar D in addition to the rake-teeth A'.

This machine is of very simple construction, may be operated with the greatest facility, and built at small cost.

Having thus described my invention, the following is what I claim as new and desire to secure by Letters Patent—

The combination of the levers E E with the bar D, clearers D', and teeth A', the whole being arranged to operate substantially as herein described.

The above specification of my improvement in horse-rakes signed this 1st day of December, 1864.

DANIEL PREST.

Witnesses:
E. A. C. SMITH,
C. D. SMITH.